Nov. 8, 1932.       L. M. ENDRES       1,886,536
TOOL REST
Filed Aug. 16, 1930
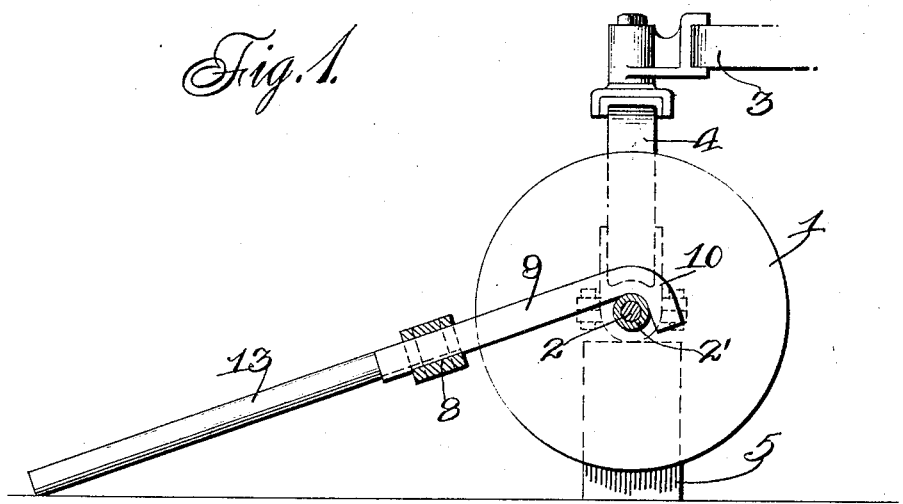
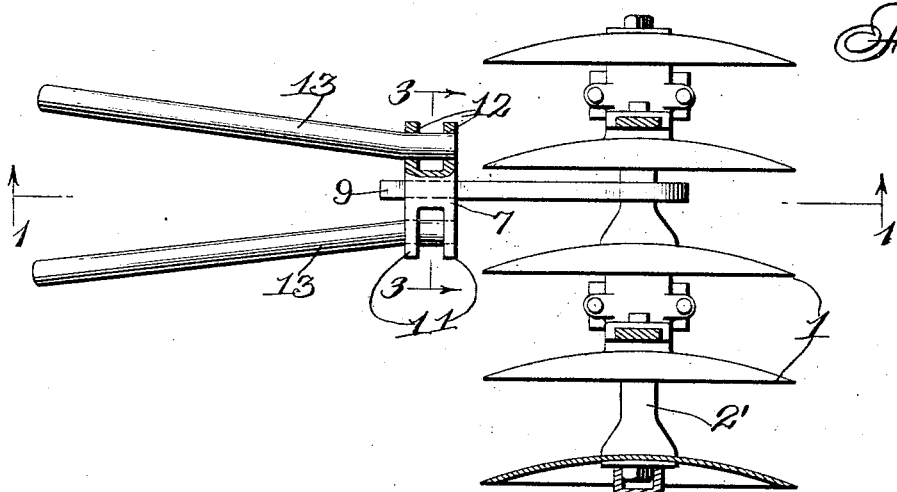
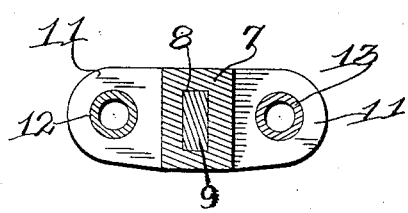

Patented Nov. 8, 1932

1,886,536

UNITED STATES PATENT OFFICE

LAWRENCE M. ENDRES, OF WAUNAKEE, WISCONSIN

TOOL REST

Application filed August 16, 1930. Serial No. 475,832.

This invention relates to improvements in a new and improved tool rest.

One of the objects of this invention is the provision of a new and improved rest for sharpening tools which are used for sharpening the discs of cultivators and harrows, so that the operator can carry out the work in a very efficient manner.

Another object of the present invention is the provision of a tool rest of the above character which can be quickly and readily associated with various types of disc harrows or cultivators, so that the body portion of the rest will be supported in close proximity to the discs of the harrows or cultivators, and can be quickly and readily detached when desired.

With the above and other objects in view, the invention consists in the novel features of construction, the combination and arrangement of parts hereinafter more fully set forth, pointed out in the claim and shown in the accompanying drawing wherein:

Figure 1 is a vertical sectional view taken substantially on the line 1—1 of Figure 2;

Figure 2 is a top plan view with parts thereof broken away and illustrated in cross section; and, Figure 3 is a detailed section on the line 3—3 of Figure 2.

As shown in the accompanying drawing, the discs 1 which are to be sharpened are carried by a revoluble shaft 2 of the harrow, a portion of the frame of which is shown at 3, the shaft being journally carried by the yoke 4 thereof. When the discs 1 are to be sharpened or ground, the shaft 2 is blocked up by means of supporting blocks 5 or they may be supported by any other suitable means so that the shaft 2 will be raised above the ground and the discs 1 may then be readily rotated either by hand or by power through a drive shaft 6.

In the accompanying drawing, the grinder for sharpening the discs has not been shown, but it is designed to be mounted upon a substantially rectangular body member 7 which is normally positioned adjacent the outer perimeters of the discs 1, as illustrated in Figure 2, and this body member 7 is provided with a longitudinal opening 8 to slidably receive the shank 9 of the shaft engaging hook 10. The hook 10 is adapted to engage the housing 2' on shaft 2 when the tool rest is to be disposed in supporting position as shown in Figures 1 and 2.

The body member 7 is provided upon opposite sides thereof with spaced ears 11 and these ears are provided with aligning apertures 12 to receive the inner ends of the spaced supporting bars 13. The bars 13 have their inner ends positioned within the apertures 12 and the bars are then extended in divergent relation from the body, as shown in Figure 2, and are also disposed in an inclined position as shown in Figure 1, thus continuing in the same plane as the shank 9 of the hook member 10, so that there will be an even slant from the collar 2' outwardly to the outer extremities of the bars 13.

From the foregoing, it will be apparent that when the hook member 10 is engaged over one of the sleeves 2', the body member 7 will be positioned adjacent the perimeters of the discs 1 and can be adjusted on the shank 9 toward or away from the discs according to the desired position of the grinding or sharpening tool which is to be used on the discs. It will also be noted that as the bars 13 continue downwardly on an incline from the body 7, the body will be properly supported relative to the discs 1.

It will be apparent from the foregoing that by using a tool rest of this character, it can be quickly and readily engaged with the supporting shaft for the discs of harrows or cultivators so that the tool rest will be supported in close proximity to the edges of these discs for readily supporting a grinding or sharpening tool which is being engaged with the discs. The device in itself is very simple in construction and can be placed upon the market at a very low cost, but at the same time will prove to be very efficient for the purpose intended.

While I have shown and described the preferred embodiment of my invention, it will be apparent that slight changes may be made in the construction when putting the invention into practice without departing from the spirit of the same or the scope of the appended claim.

I claim:

A tool mount for sharpening discs of farm implements comprising a block constituting a tool rest and support, the block including a centrally disposed body portion and pairs of laterally extending ears, the body portion having a centrally disposed bore, each pair of ears having openings therein parallel with and in the same horizontal plane as the bore, a forwardly extending supporting hook having a shank and a bill thereon for engaging the farm implements between a pair of the discs thereon, the shank being slidably received in the bore whereby the block can be moved toward and away from the discs, and rearwardly extending diverging ground engaging supporting legs received in the openings of the ears.

In testimony that I claim the foregoing I have hereunto set my hand at Waunakee, in the county of Dane and State of Wisconsin.

LAWRENCE M. ENDRES.